W. L. TOBIAS.
STEERING WHEEL.
APPLICATION FILED SEPT. 29, 1920.
1,422,323.
Patented July 11, 1922.
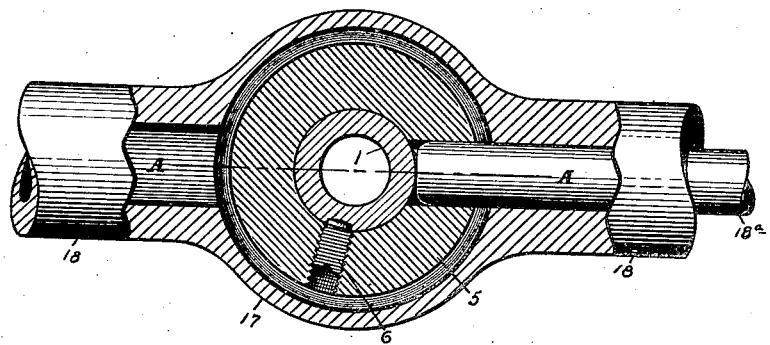
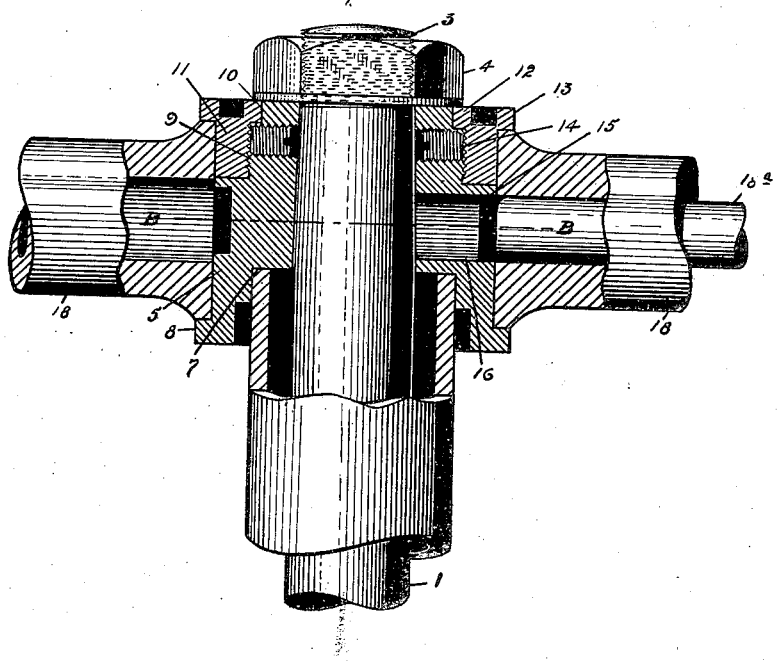
Inventor,
W. L. Tobias.
By E. J. Fetherstonhaugh,
Atty.

UNITED STATES PATENT OFFICE.

WILLIAM LINCOLN TOBIAS, OF TORONTO, ONTARIO, CANADA, ASSIGNOR TO JOSEPH WILLIAM McNAB, OF TORONTO, ONTARIO, CANADA.

STEERING WHEEL.

1,422,323.  Specification of Letters Patent.  Patented July 11, 1922.

Application filed September 29, 1920. Serial No. 413,634.

*To all whom it may concern:*

Be it known that I, WILLIAM LINCOLN TOBIAS, a citizen of the United States of America, and resident of 73 Mavety St., in the city of Toronto, in the county of York, in the Province of Ontario, in the Dominion of Canada, have invented certain new and useful Improvements in Steering Wheels, of which the following is a specification.

The invention relates to improvements in steering wheels as described in the present specification and shown in the accompanying drawings that form a part of the same.

The invention consists essentially of the novel means employed for securing the wheel to the steering post.

The objects of the invention are to eliminate all play between the steering wheel and the post and at the same time to permit of said wheel spinning freely on said post, to provide a connecting member having the maximum of strength and generally to provide a steering wheel mechanism which will be inexpensive of construction, efficient in operation and durable.

In the drawings Figure 1 is a horizontal sectional view through the steering post and portion of the spider taken on the line B—B of Figure 2, portions of said spider being shown in full.

Figure 2 is a verticle sectional view taken on the line A—A of Figure 1.

Like numerals of reference indicate corresponding parts in the various figures.

Referring to the drawings 1 is the steering post projecting upwardly from within the casing 2 and being threaded as at 3 to receive a retaining nut 4.

5 is a bushing or collar fitting between the post 1 and the spider and being locked to said post by means of set screws 6 extending into said post, the central opening through said bushing being enlarged adjacent to the lower end to snugly accommodate the end of the casing 2 which abuts the interior shoulder 7, thus forming a firm support for said bushing, said bushing being provided at its lower end with an annular flange 8 forming a support for the spider.

The top end of the member 5 is reduced in substantially step formation as at 9 and 10 and terminates adjacent to the co-movement of the threads 3 on the post 1, the portion 9 being threaded exteriorly while the outer surface of the portion 10 is smooth.

11 is an annular cap substantially T shape in cross section and threaded interiorly to engage the threads 3 on the post, the inner flange 12 being adapted to engage the smooth outer wall of the reduced end 10 of said post and the outer flange 13 extending over the top edge of the circular portion of the spider.

14 are locking screws extending outwardly through the threaded portion 9 of the bushing and adapted to be forced into engagement with the threaded interior of the cap 11.

The bushing or collar 5 is provided with an annular groove 15 therearound in the longitudinal centre thereof and is also provided with a bolt hole 16 extending inwardly through one side thereof, the diameter of said bolt hole being preferably equal to the width of said groove 15.

17 is the spider comprising a central tubular portion of greater diameter than the post and having oppositely disposed hollow arms 18, one or both of which is adapted to slidably accommodate a locking bolt 18$^a$ which in operation is adapted to extend into the hole 16 in the bushing to prevent rotation of said spider. If desirable the post 1 may be provided with an opening located in register with the hole 16 and receiving the bolt 18$^a$ to insure positive connection between the steering wheel and the post.

In the operation of this invention the spider is normally keyed to the post by means of the bolt 18 extending into the bushing 8 which itself is locked to the post and when it is desired to release the spider from operative connection with said post it is simply necessary to withdraw said bolt from the slot 16 and the spider will spin freely on its bearings. The wheel can readily be removed by simply swerving the nut 4 and the cap 11.

It will have been apparent from the foregoing that a bearing is provided on which the spider may rotate freely without allowing any play whatsoever thus giving the maximum of strength and durability without detracting from the appearance of the wheel.

What I claim is:—

1. In a steering wheel, a steering post, a tube enclosing said post and terminating short of the top end of said post, a spider, a bushing keyed to said post and having the opening therethrough enlarged adjacent to the lower end thereof to receive said tube, said bushing being flanged around its lower end to form a support for said spider, said bushing also being reduced in thickness at its top end and threaded exteriorly, a cap threading over said top end and flanged to extend over the edge of said spider, and a bolt slidable in said spider and adapted to be projected into said bushing to prevent rotation of said spider.

2. In a steering wheel, a steering post, a tube enclosing said post and terminating short of the top end of said post, a spider, a bushing encircling said post and keyed thereto and slotted interiorly to receive said tube, said bushing being flanged around its lower end to form a support for said spider, said bushing also being reduced in thickness adjacent to its top and forming an intermediate exteriorly threaded portion terminating in a reduced end having a smooth outer surface, an annular cap screwing over said intermediate portion and having oppositely disposed flanges the inner of which abuts said reduced end and the outer of which projects over the edge of said spider, and a locking bolt slidable in an arm of said spider and adapted to be projected into said bushing to prevent rotation of said spider.

3. In a steering wheel, a post, a tube encircling said post and terminating short of the top end of said post, a spider, comprising a cylindrical central portion and arms, a bushing encircling said post and keyed thereto and slotted interiorly to receive said tube, said bushing being flanged around its lower end to form a support for said spider, a said bushing also being reduced in thickness adjacent to its top end forming an intermediate exteriorly threaded portion terminating in a reduced end having a smooth outer surface, an annular cap screwing over said intermediate portion and having oppositely disposed flanges, the inner of which abuts said reduced end and the outer of which projects over the edge of said spider, said bushing being grooved circumferentially substantially centrally thereof, a locking bolt slidable in an arm of said spider and adapted to be projected into said bushing to prevent rotation of said spider, and a retaining nut screwing over the end of said post.

Signed at the city of Toronto, this twenty-eighth day of Aug., 1920.

WILLIAM LINCOLN TOBIAS.

Witnesses:
W. G. HAMMOND,
G. MURPHY.